US010657434B2

(12) United States Patent
Seow et al.

(10) Patent No.: US 10,657,434 B2
(45) Date of Patent: May 19, 2020

(54) ANOMALY SCORE ADJUSTMENT ACROSS ANOMALY GENERATORS

(71) Applicant: Intellective Ai, Inc., Dallas, TX (US)

(72) Inventors: Ming-Jung Seow, The Woodlands, TX (US); Gang Xu, Katy, TX (US); Tao Yang, Katy, TX (US); Wesley Kenneth Cobb, The Woodlands, TX (US)

(73) Assignee: Intellective Ai, Inc., Dallas, TX (US)

( * ) Notice: Subject to any disclaimer, the term of this patent is extended or adjusted under 35 U.S.C. 154(b) by 875 days.

(21) Appl. No.: 15/091,209

(22) Filed: Apr. 5, 2016

(65) Prior Publication Data

US 2017/0286863 A1 Oct. 5, 2017

(51) Int. Cl.
*G06N 3/02* (2006.01)

(52) U.S. Cl.
CPC ...................... *G06N 3/02* (2013.01)

(58) Field of Classification Search
CPC ....... G06F 17/30; G06F 17/3053; G06N 5/00; G06N 5/04; G06N 5/047; G06N 5/048; G06N 99/00; G06N 99/005
See application file for complete search history.

(56) References Cited

U.S. PATENT DOCUMENTS

| 2015/0047040 A1* | 2/2015 | Cobb ................. G06F 17/2785 726/23 |
| 2015/0154508 A1* | 6/2015 | Chen .................. G06F 17/3053 706/12 |
| 2017/0063894 A1* | 3/2017 | Muddu ............... H04L 63/1425 |
| 2017/0279834 A1* | 9/2017 | Vasseur ............... H04L 63/1425 |

* cited by examiner

*Primary Examiner* — Li Wu Chang

(57) ABSTRACT

Techniques are disclosed for generating an anomaly score for a neuro-linguistic model of input data obtained from one or more sources. According to one embodiment, generating an anomaly score comprises receiving a score indicating how often a characteristic is observed in the input data. Upon receiving the score, comparing the score with an unusual score model to determine an unusualness score and comparing the unusualness score with an anomaly score model based on one or more unusual score models to generate the anomaly score indicating an overall unusualness for the input data.

19 Claims, 8 Drawing Sheets

ANOMALY SCORE ADJUSTMENT ACROSS ANOMALY GENERATORS

BACKGROUND

Field

Embodiments described herein generally relate to data analysis systems and more particularly to anomaly score adjustment across anomaly generators.

Description of the Related Art

Many currently available surveillance and monitoring systems (e.g., video surveillance systems, SCADA systems, data network security systems, and the like) are trained to observe specific activities and alert an administrator after detecting those activities.

However, such rules-based systems require advance knowledge of what actions and/or objects to observe. The activities may be hard-coded into underlying applications or the system may train itself based on any provided definitions or rules. In other words, unless the underlying code includes descriptions of certain behaviors or rules for generating an alert for a given observation, the system is incapable of recognizing such behaviors. Such a rules-based approach is rigid. That is, unless a given behavior conforms to a pre-defined rule, an occurrence of the behavior can go undetected by the monitoring system. Even if the system trains itself to identify the behavior, the system requires rules to be defined in advance for what to identify.

In addition, many surveillance systems, e.g., video surveillance systems, require a significant amount of computing resources, including processor power, storage, and bandwidth. For example, typical video surveillance systems require a large amount of computing resources per camera feed because of the typical size of video data. Given the cost of the resources, such systems are difficult to scale.

SUMMARY

One embodiment presented herein includes a method for generating an anomaly score for a neuro-linguistic model of input data obtained from one or more sources. The method generally comprises receiving a score indicating how often a characteristic is observed in the input data. Upon receiving the score, comparing the score with an unusual score model to determine an unusualness score and comparing the unusualness score with an anomaly score model based on one or more unusual score models to generate the anomaly score indicating an overall unusualness for the input data.

Another embodiment presented herein includes a computer-readable storage medium storing instructions, which, when executed on a processor, performs an operation for generating an anomaly score for a neuro-linguistic model of input data obtained from one or more sources. The operation itself generally includes receiving a score indicating how often a characteristic is observed in the input data. Upon receiving the score, comparing the score with an unusual score model to determine an unusualness score and comparing the unusualness score with an anomaly score model based on one or more unusual score models to generate the anomaly score indicating an overall unusualness for the input data.

Yet another embodiment presented herein includes a system having a processor and a memory storing one or more application programs configured to perform an operation for generating an anomaly score for a neuro-linguistic model of input data obtained from one or more sources. The operation itself generally includes receiving a score indicating how often a characteristic is observed in the input data. Upon receiving the score, comparing the score with an unusual score model to determine an unusualness score and comparing the unusualness score with an anomaly score model based on one or more unusual score models to generate the anomaly score indicating an overall unusualness for the input data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only exemplary embodiments and are therefore not to be considered limiting of its scope, may admit to other equally effective embodiments.

To facilitate understanding, identical reference numerals have been used, where possible, to designate identical elements that are common to the figures. It is contemplated that elements and features of one embodiment may be beneficially incorporated in other embodiments without further recitation.

DETAILED DESCRIPTION

Figure 1:
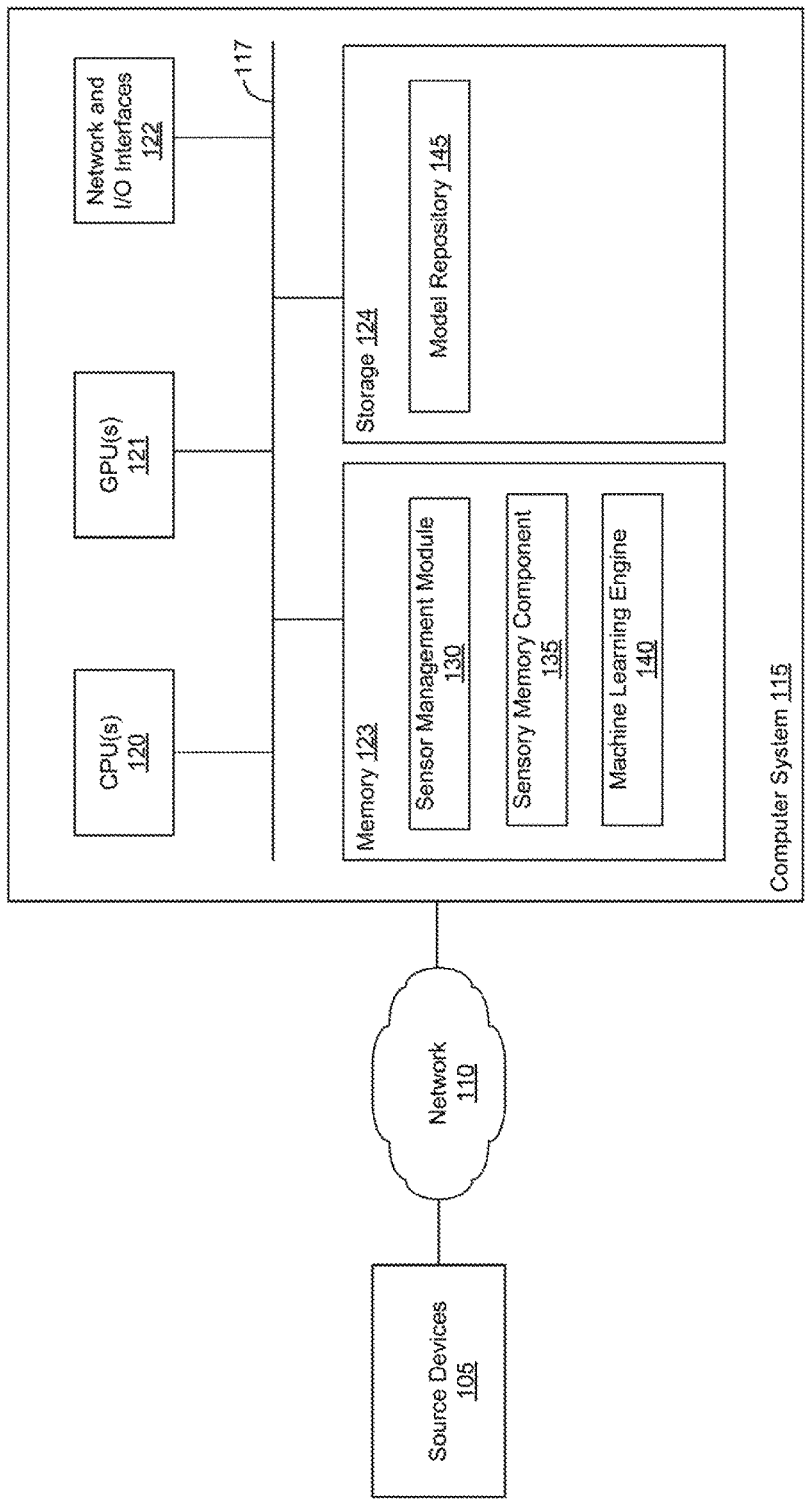
FIG. 1 illustrates an example computing environment for a neuro-linguistic behavior recognition system, according to some embodiments.

Embodiments presented herein describe a behavior recognition system. The behavior recognition system may be configured with one or more data collector components that collect raw data values from different data sources (e.g., video data, building management data, SCADA data, network data). For example, a behavior recognition system may be configured for video surveillance. The behavior recognition system may include a data collector component that retrieves video frames in real-time, separates foreground objects from background objects, and tracks foreground objects from frame-to-frame. The data collector component may normalize the video frame data into numerical values (e.g., falling within a range from 0 to 1 with respect to a given data type).

In some embodiments, the behavior recognition system includes a neuro-linguistic module that performs neural network-based linguistic analysis on the collected data. Specifically, for each type of data monitored by a sensor, the neuro-linguistic module creates and refines a linguistic model of the normalized data. That is, the neuro-linguistic module builds a grammar used to describe the normalized data. The linguistic model includes symbols that serve as building blocks for the grammar. The neuro-linguistic module identifies combinations of symbols to build a dictionary of words. Once the dictionary is built, the neuro-linguistic module identifies phrases that include various combinations of words in the dictionary. The behavior recognition system uses such a linguistic model to describe what is being observed. The linguistic model allows the behavior recognition system to distinguish between normal and abnormal activity observed in the input data. As a result, the behavior recognition system can issue alerts whenever abnormal activity occurs.

To generate the linguistic model, a neuro-linguistic module receives normalized data values and organizes the data into clusters. The neuro-linguistic module evaluates statistics of each cluster and identifies statistically relevant clusters. Further, the neuro-linguistic module generates symbols, e.g., letters, corresponding to each statistically relevant cluster. Thus, input values mapping to a given cluster may correspond to a symbol.

The neuro-linguistic module generates a lexicon, i.e., builds a dictionary, of observed combinations of symbols, i.e., words, based on a statistical distribution of symbols identified in the input data. Specifically, the neuro-linguistic module may identify patterns of symbols in the input data at different frequencies of occurrence. Further, the neuro-linguistic module can identify statistically relevant combinations of symbols at different lengths (e.g., from one-symbol to a maximum-symbol word length). The neuro-linguistic module may include such statistically relevant combinations of symbols in a dictionary used to identify phrases for the linguistic model.

Using words from the dictionary, the neuro-linguistic module generates phrases based on probabilistic relationships of each word occurring in sequence relative to other words as additional data is observed. For example, the neuro-linguistic module may identify a relationship between a given three-letter word that frequently appears in sequence with a given four-letter word, and so on. The neuro-linguistic module determines a syntax based on the identified phrases.

The syntax allows the behavior recognition system to learn, identify, and recognize patterns of behavior without the aid or guidance of predefined activities. Unlike a rules-based surveillance system, which contains predefined patterns of what to identify or observe, the behavior recognition system learns patterns by generalizing input and building behavior memories of what is observed. Over time, the behavior recognition system uses these memories to distinguish between normal and anomalous behavior reflected in observed data.

For example, the neuro-linguistic module builds letters, words, phrases, and estimates an "unusualness score" for each identified letter, word, or phrase. The unusualness score (for a letter, word, or phrase observed in input data) provides a measure of how infrequently the letter, word, or phrase has occurred relative to past observations. Thus, the behavior recognition system may use the unusualness scores to both measure how unusual a current syntax is, relative to a stable model of symbols (i.e., letters), a stable model of words built from the symbols (i.e., a dictionary) and a stable model of phrase built from the words (i.e., a syntax)—collectively the neuro-linguistic model.

As the neuro-linguistic module continues to receive input data, the neuro-linguistic module may decay, reinforce, and generate the letters, words, and syntax models. In parlance with the machine learning field, the neuro-linguistic module "learns on-line" as new data is received and occurrences a given type of input data either increases, decreases, appears, or disappears.

FIG. 1 illustrates an example computing environment for a neuro-linguistic behavior recognition system 100, according to some embodiments. As shown, the behavioral recognition system 100 includes one or more input source devices 105, a network 110, and one or more computer systems 115. The network 110 may transmit data input by the source devices 105 to the computer system 115. Generally, the computing environment 100 may include one or more physical computer systems 115 connected via a network (e.g., the Internet, wireless networks, local area networks). Alternatively, the computer systems 115 may be cloud computing resources connected by the network. Illustratively, the computer system 115 includes one or more central processing units (CPU) 120, one or more graphics processing units (GPU) 121, network and I/O interfaces 122, a storage 124 (e.g., a disk drive, optical disk drive, and the like), and a memory 123 that includes a sensor management module 130, a sensory memory component 135, and a machine learning engine 140. The memory 123 may comprise one or more memory devices, such as system memory and graphics memory. The memory 123 is generally included to be representative of a random access memory (e.g., DRAM, SRAM, SDRAM). The memory 123 and storage 124 may be coupled to the CPU 120, GPU 121, and network and I/O interfaces 122 across one or more buses 117. The storage 124 includes a model repository 145. Additionally, storage 124, may generally include one or more devices such as a hard disk drive, solid state device (SSD), or flash memory storage drive, and may store non-volatile data as required.

The CPU 120 retrieves and executes programming instructions stored in the memory 123 as well as stores and retrieves application data residing in the storage 124. In some embodiments, the GPU 121 implements a Compute Unified Device Architecture (CUDA). Further, the GPU 121 is configured to provide general purpose processing using the parallel throughput architecture of the GPU 121 to more efficiently retrieve and execute programming instructions stored in the memory 123 and also to store and retrieve application data residing in the storage 124. The parallel throughput architecture provides thousands of cores for processing the application and input data. As a result, the GPU 121 leverages the thousands of cores to perform read and write operations in a massively parallel fashion. Taking advantage of the parallel computing elements of the GPU 121 allows the behavior recognition system 100 to better process large amounts of incoming data (e.g., input from a video and/or audio source). As a result, the behavior recognition system 100 may scale with relatively less difficulty.

The sensor management module 130 provides one or more data collector components. Each of the collector components is associated with a particular input data source, e.g., a video source, a SCADA (supervisory control and data acquisition) source, an audio source, a network traffic source, etc. The collector components retrieve (or receive, depending on the sensor) input data from each source at specified intervals (e.g., once a minute, once every thirty minutes, once every thirty seconds, etc.). The sensor management module 130 controls the communications between the data sources. Further, the sensor management module 130 normalizes input data and sends the normalized data to the sensory memory component 135.

The sensory memory component 135 is a data store that transfers large volumes of data from the sensor management module 130 to the machine learning engine 140. The sensory memory component 135 stores the data as records. Each record may include an identifier, a timestamp, and a data payload. Further, the sensory memory component 135 aggregates incoming data in a time-sorted fashion. Storing incoming data from each of the data collector components in a single location where the data may be aggregated allows the machine learning engine 140 to process the data efficiently. Further, the computer system 115 may reference data stored in the sensory memory component 135 in generating alerts for anomalous activity. In some embodiments, the sensory memory component 135 may be implemented in via a virtual memory file system in the memory 123. In another embodiment, the sensory memory component 135 is implemented using a key-value share.

The machine learning engine 140 receives data output from the_sensor management module 135. Generally, components of the machine learning engine 140 generate a linguistic representation of the normalized vectors. As described further below, to do so, the machine learning engine 140 clusters normalized values having similar features and assigns a distinct symbol to each cluster. The machine learning engine 140 may then identify recurring combinations of symbols (i.e., words) in the data. The machine learning engine 140 then similarly identifies recurring combinations of words (i.e., phrases) in the data.

Note, however, FIG. 1 illustrates merely one possible arrangement of the behavior recognition system 100. For example, although the input data sources 105 are shown connected to the computer system 115 via network 110, the network 110 is not always present or needed (e.g., an input source such as a video camera may be directly connected to the computer system 115).

Figure 2:
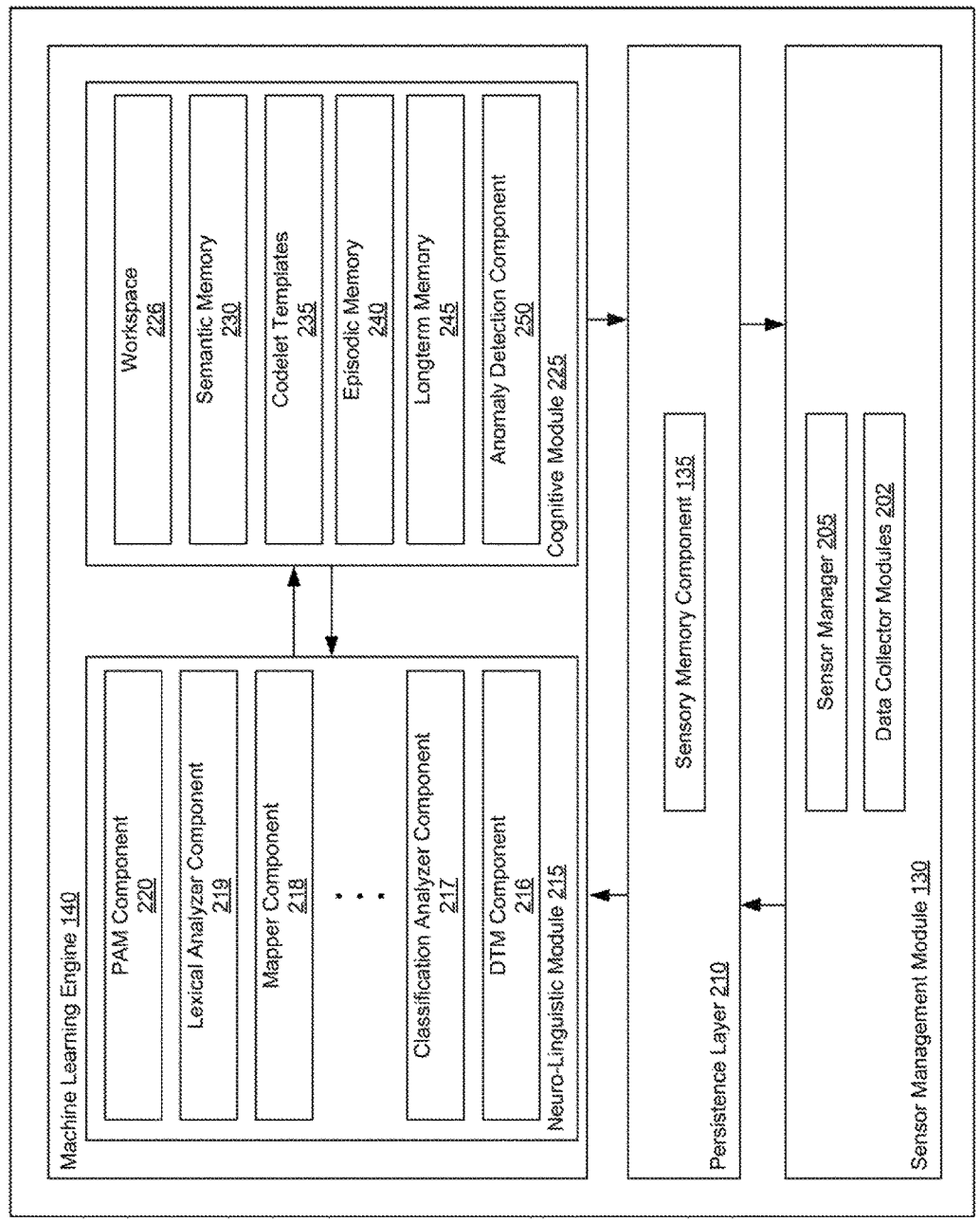
FIG. 2 illustrates a system architecture of the neuro-linguistic behavior recognition system, according to some embodiments.

FIG. 2 illustrates a system architecture of the neuro-linguistic behavior recognition system, according to some embodiments. As shown, the sensor management module 130 and the machine learning engine 140 communicate via a persistence layer 210.

The persistence layer 210 includes data stores that maintain information used by components of the computer system 115. For example, the persistence layer 210 includes data stores that maintain information describing properties of the data collector modules 202, system properties (e.g., serial numbers, available memory, available capacity, etc. of the computer system 115), and properties of the source driver (e.g., active plug-ins 118, active sensors associated with each data source, normalization settings, etc.). Other data stores may maintain learning model information, system events, and behavioral alerts. In addition, the sensory memory component 135 resides in the persistence layer 210.

The machine learning engine 140 itself includes a neuro-linguistic module 215 and a cognitive module 225. The neuro-linguistic module 215 performs neural network-based linguistic analysis of normalized input data to build a neuro-linguistic model of the observed input data. The behavior recognition system can use the linguistic model to describe subsequently observed activity. However, rather than describing the activity based on pre-defined objects and actions, the neuro-linguistic module 215 develops a custom language based on symbols, words, and phrases generated from the input data. As shown, the neuro-linguistic module 215 includes a data transactional memory (DTM) component 216, a classification analyzer component 217, a mapper component 218, a lexical analyzer component 219, and a perceptual associative memory (PAM) component 220. Additionally in some embodiments, the neuro-linguistic module 215 may also contain additional modules, for example, a trajectory module, for observing and describing various activities.

In some embodiments, the DTM component 216 retrieves the normalized vectors of input data from the sensory memory component 135 and stages the input data in the pipeline architecture provided by the GPU 121. The classification analyzer component 217 evaluates the normalized data organized by the DTM component 216 and maps the data on a neural network. In some embodiments, the neural network is a combination of a self-organizing map (SOM) and an adaptive resonance theory (ART) network.

The mapper component 218 clusters the data streams based on values occurring repeatedly in association with one another. Further, the mapper component 218 generates a set of clusters for each input feature. For example, assuming that the input data corresponds to video data, features may include location, velocity, acceleration etc. The mapper component 218 would generate separate sets of clusters for each of these features. The mapper component 218 identifies symbols (i.e., builds an alphabet of letters) based on the clustered input data. Specifically, the mapper component 218 determines a statistical distribution of data in each cluster. For instance, the mapper component 218 determines a mean, variance, and standard deviation for the distribution of values in the cluster. The mapper component 218 also updates the statistics as more normalized data is received. Further, each cluster may be associated with a statistical significance score. The statistical significance for a given cluster increases as more data is received which maps to that cluster. In addition, the mapper component 218 decays the statistical significance of the cluster as the mapper component 218 observes data mapping to the cluster less often over time.

In some embodiments, the mapper component 218 assigns a set of symbols to clusters having statistical significance. A cluster may have statistical significance if a threshold amount of input data mapping to that cluster is exceeded. A symbol may be described as a letter of an alphabet used to create words used in the neuro-linguistic analysis of the input data. A symbol provides a "fuzzy" representation of the data belonging to a given cluster.

Further, the mapper component 218 is adaptive. That is, the mapper component 218 may identify new symbols corresponding to new clusters generated from the normalized data, as such clusters are reinforced over time (resulting in such clusters reaching a level statistical significance relative to the other clusters that emerge from the input data). The mapper component 218 "learns on-line" and may merge similar observations to a more generalized cluster. The mapper component 218 may assign a distinct symbol to the resulting cluster.

Once a cluster has reached statistical significance (i.e., data observed as mapping to that cluster has reached a threshold amount of points), the mapper component 219 begins sending corresponding symbols to the lexical analyzer component 219 in response to normalized data that maps to that cluster. In some embodiments, the mapper component 218 limits symbols that can be sent to the lexical component 219 to the most statistically significant clusters. In practice, outputting symbols (i.e., letters) assigned to the top thirty-two clusters has shown to be effective. However, other amounts may also prove effective, such as the top sixty-four or 128 most frequently recurring clusters. Note, over time, the most frequently observed symbols may change as clusters increase (or decrease) in statistical significance. As such, it is possible for a given cluster to lose statistical significance. Over time, thresholds for statistical significance can increase, and thus, if the amount of observed data mapping to a given cluster fails to meet a threshold, then the cluster loses statistical significance.

In some embodiments, the mapper component 218 evaluates an unusualness score for each symbol. The unusualness score is based on the frequency of a given symbol relative to other symbols observed in the input data stream, over time. The unusualness score may increase or decrease over time as the neuro-linguistic module 215 receives additional data.

The mapper component 218 sends a stream of the symbols (e.g., letters), timestamp data, unusualness scores, and statistical data (e.g., a representation of the cluster associated with a given symbol) to the lexical analyzer component 219. The lexical analyzer component 219 builds a dictionary based on symbols output from the mapper component 218. In practice, the mapper component 218 may need approximately 5000 observations (i.e., normalized vectors of input data) to generate a stable alphabet of symbols.

The lexical analyzer component 219 builds a dictionary that includes combinations of co-occurring symbols, e.g., words, from the symbols transmitted by the mapper component 218. The lexical analyzer component 219 identifies repeating co-occurrences of letters and features output from the mapper component 218 and calculates frequencies of the co-occurrences occurring throughout the symbol stream. The combinations of symbols may represent a particular activity, event, etc.

In some embodiments, the lexical analyzer component 219 limits the length of words in the dictionary to allow the lexical analyzer component 219 to identify a number of possible combinations without adversely affecting the performance of the computer system 115. Further, the lexical analyzer component 219 may use level-based learning models to analyze symbol combinations and learn words. The lexical analyzer component 219 learns words up through a maximum symbol combination length at incremental levels, i.e., where one-letter words are learned at a first level, two-letter words are learned at a second level, and so on. In practice, limiting a word to a maximum of five or six symbols has shown to be effective.

Like the mapper component 218, the lexical analyzer component 219 is adaptive. That is, the lexical analyzer component 219 may learn and generate words in the dictionary over time. The lexical analyzer component 219 may also reinforce or decay the statistical significance of words in the dictionary as the lexical analyzer component 219 receives subsequent streams of symbols over time. Further, the lexical analyzer component 219 may determine an unusualness score for each word based on how frequently the word recurs in the data. The unusualness score may increase or decrease over time as the neuro-linguistic module 215 processes additional data.

In addition, as additional observations (i.e., symbols) are passed to the lexical analyzer component 219 and identified as a being part of a given word, the lexical analyzer component 219 may determine that the word model has matured. Once a word model has matured, the lexical analyzer component 219 may output observations of those words in the model to the PAM component 219. In some embodiments, the lexical analyzer component 219 limits words sent to the PAM component 320 to the most statistically relevant words. In practice, for each single sample, outputting occurrences of the top thirty-two most frequently occurring words has shown to be effective (while the most frequently occurring words stored in the models can amount to thousands of words). Note, over time, the most frequently observed words may change as the observations of incoming letters change in frequency (or as new letters emerge by the clustering of input data by the mapper component 218.

Once the lexical analyzer component 219 has built the dictionary (i.e., identifies words that have a reached a predefined statistical significance), the lexical analyzer component 219 sends occurrences of words subsequently observed in the input stream to the PAM component 220. The PAM component 220 builds a syntax of phrases with from the words output by the lexical analyzer component 219. In practice, lexical analyzer component 219 may build a useful dictionary of words after receiving approximately 15,000 observations (i.e., input letters from the mapper component 218).

The PAM component 220 identifies a syntax of phrases based on the sequence of words output from the lexical analyzer component 219. Specifically, the PAM component 220 receives the words identified by the lexical analyzer component 219 generates a connected graph, where the nodes of the graph represent the words, and the edges represent a relationship between the words. The PAM component 220 may reinforce or decay the links based on the frequency that the words are connected with one another in a data stream.

Similar to the mapper component 218 and the lexical analyzer component 219, the PAM component 220 determines an unusualness score for each identified phrase based on how frequently the phrase recurs in the linguistic data. The unusualness score may increase or decrease over time as the neuro-linguistic module 215 processes additional data.

Similar to the lexical analyzer component 219, the PAM component 220 may limit the length of a given phrase to allow the PAM component 220 to be able to identify a number of possible combinations without adversely affecting the performance of the computer system 115.

The PAM component 220 identifies syntax phrases over observations of words output from the lexical analyzer component 219. As observations of words accumulate, the PAM component 220 may determine that a given phrase has matured, i.e., a phrase has reached a measure of statistical relevance. The PAM component 220 then outputs observations of that phrase to the cognitive module 225. The PAM component 220 sends data that includes a stream of the symbols, words, phrases, timestamp data, unusualness scores, and statistical calculations to the cognitive module 325. In practice, the PAM component 220 may obtain a meaningful set of phrases after observing about 5000 words from the lexical analyzer component 219.

After maturing, the generated letters, words, and phrases form a stable neuro-linguistic model of the input data that the computer system 115 uses to compare subsequent observations of letters, words, and phrases against the stable model. The neuro-linguistic module 215 updates the linguistic model as new data is received. Further, the neuro-linguistic module 215 may compare a currently observed syntax to the model. That is, after building a stable set of letters, the neuro-linguistic module 215 may build a stable model of words (e.g., a dictionary). In turn, the neuro-linguistic module 215 may be used to build a stable model of phrases (e.g., a syntax). Thereafter, when the neuro-linguistic module 215 receives subsequently normalized data, the module 215 can output an ordered stream of symbols, words, and phrases, all of which can be compared to the stable model to identify interesting patterns or detect deviations occurring in the stream of input data.

The cognitive module 225 performs learning analysis on the linguistic content (i.e., the identified symbols, words, phrases) delivered to semantic memory 230 by comparing new observations to the learned patterns in the stable neuro-linguistic model kept in semantic memory 230 and then estimating the unusualness of these new observations.

As shown, the cognitive module 225 includes a workspace 226, a semantic memory 230, codelet templates 235, episodic memory 240, long term memory 245, and an anomaly detection component 250. The semantic memory 230 stores the stable neuro-linguistic model described above, i.e., a stable copy from the mapper component 218, lexical analyzer component 219, and the PAM component 220.

In some embodiments, the workspace 226 provides a computational engine for the machine learning engine 140. The workspace 226 performs computations (e.g., anomaly modeling computations) and stores immediate results from the computations.

The workspace 226 retrieves the neuro-linguistic data from the PAM component 220 and disseminates this data to different portions of the cognitive module 225 as needed.

The episodic memory 240 stores linguistic observations related to a particular episode in the immediate past and may encode specific details, such as the "what" and the "when" of a particular event.

The long-term memory 245 stores generalizations of the linguistic data with particular episodic details stripped away. In this way, when a new observation occurs, memories from the episodic memory 240 and the long-term memory 245 may be used to relate and understand a current event, i.e., the new event may be compared with past experience (as represented by previously observed linguistic data), leading to both reinforcement, decay, and adjustments to the information stored in the long-term memory 245, over time. In a particular embodiment, the long-term memory 245 may be implemented as an ART network and a sparse-distributed memory data structure. Importantly, however, this approach does not require events to be defined in advance.

The codelet templates 235 provide a collection of executable codelets, or small pieces of code that evaluate different sequences of events to determine how one sequence may follow (or otherwise relate to) another sequence. The codelet templates 325 may include deterministic codelets and stochastic codelets. More generally, a codelet may detect interesting patterns from the linguistic representation of input data. For instance, a codelet may compare a current observation (i.e., a current phrase instance with what has been observed in the past) with previously observed activity stored in the semantic memory 230. By repeatedly scheduling codelets for execution, copying memories and percepts to/from the workspace 226, the cognitive module 225 performs a cognitive cycle used to observe, and learn, about patterns of behavior that occur within the linguistic data.

The anomaly detection component 250 evaluates unusualness scores sent by the neuro-linguistic module 215 to determine whether to issue an alert in response to some abnormal activity indicated by the unusualness scores. As further detailed below, the anomaly detection component 250 provides probabilistic histogram models (e.g., an unusual lexicon score model, an unusual syntax score model, and an anomaly model) which represent the unusualness scores. The unusual lexicon or word model and unusual syntax score model are generated based on unusualness scores sent from the lexical analyzer component 219 and the PAM component 220, respectively. The anomaly normalizer receives input percentiles from the unusual lexicon score model and unusual syntax score model and generates a normalized absolute unusualness score based on the percentiles for a given sample. The anomaly detection component 250 evaluates the unusualness scores of each of the symbols, words, and phrases to identify abnormal occurrences in the observed data and determines whether to send an alert based on a given score. The anomaly detection component 250 may send alert data to an output device, where an administrator may view the alert, e.g., via a management console.

Figure 3:
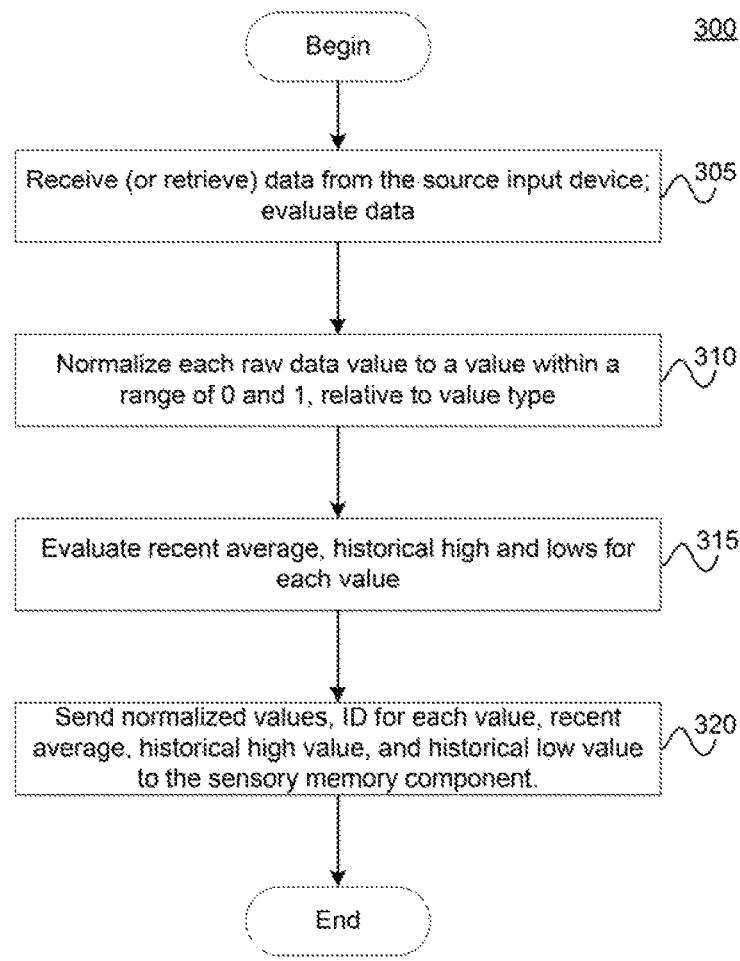
FIG. 3 illustrates a method for collecting sensor data for use in a neuro-linguistic behavior recognition system, according to some embodiments.

FIG. 3 illustrates a method 300 for collecting sensor data for use in the neuro-linguistic behavior recognition system, according to some embodiments. More specifically, method 300 describes a method for a data collector to retrieve or receive data from an associated input device and send the data to the neuro-linguistic module 215. For this example, assume that a data collector module 202 is a video source capturing image data at a given frame rate. Of course, a variety of data collector components 202 can be used.

Method 300 begins at step 305, where the data collector module 202 retrieves (or receives) data from the source input device. In this case, the data collector module 202 may retrieve video frames from a video source, such as a video camera positioned to observe a particular location, such as a hotel lobby. Further, the data collector module 202 identifies data values to send to the sensory memory component 135. To do so, the data collector module 202 may evaluate the video frames to separate foreground objects from background objects, measure appearance and kinematic information of the identified foreground objects, and track foreground objects moving across the scene (i.e., the field of view of the camera). As a result, the data collector module 202 generates a set of data values characterizing appearance and kinematic aspects of the objects depicted in video frames.

At step 310, the data collector module 202 normalizes each data value to a numerical value falling within a range, e.g., between 0 to 1, inclusive, relative to the type of that data value. For example, values associated with kinematic features are normalized from 0 to 1 relative to other values associated with kinematic features. Doing so converts each value to a common format and allows the neuro-linguistic module 215 to recognize recurring events in the video stream.

After normalizing the values, at step 315, the data collector module 202 identifies additional data associated with the normalized values, such as a timestamp of a given value, an average associated with the data type (e.g., kinematic features, appearance features, location, position, etc.) of the value, and historical high and low values for that data type. Doing so allows the data collector module 202 to readjust the normalization in the event that the video source is modified. Specifically, the data collector module 202 references the identified historical values and averages to readjust the normalization.

At step 320, the data collector module 202 sends a vector of the normalized values and associated data to the sensory memory component 135. As stated, the sensory memory component 135 stores the normalized values and associated data. The neuro-linguistic module 215 may then retrieve the normalized values from the sensory memory component 135 and perform linguistic analysis thereafter.

Figure 4:
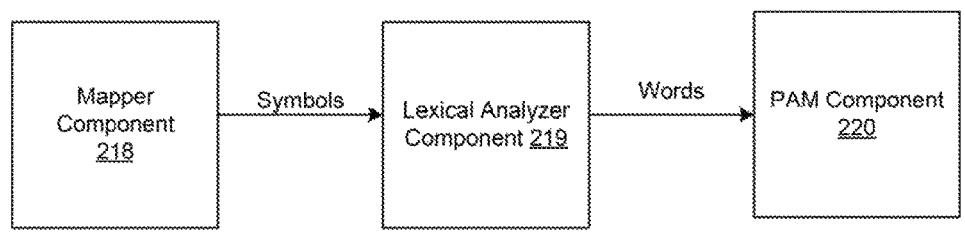
FIG. 4 illustrates components of the neuro-linguistic module, according to some embodiments.

FIG. 4 illustrates components of the neuro-linguistic module 215, according to some embodiments. As stated, the mapper component 218 generates a stream of symbols based on data sent from a given source (e.g., a video source). Illustratively, the mapper component 218 sends the stream of symbols to the lexical analyzer component 219. The lexical analyzer component 219 builds a dictionary of words, i.e., combinations of symbols, based on statistical frequencies of groups of symbols appearing in the stream. The lexical analyzer component 219 outputs statistically significant words to the PAM component 220 for syntactic analysis based on groups of words.

Figure 5:
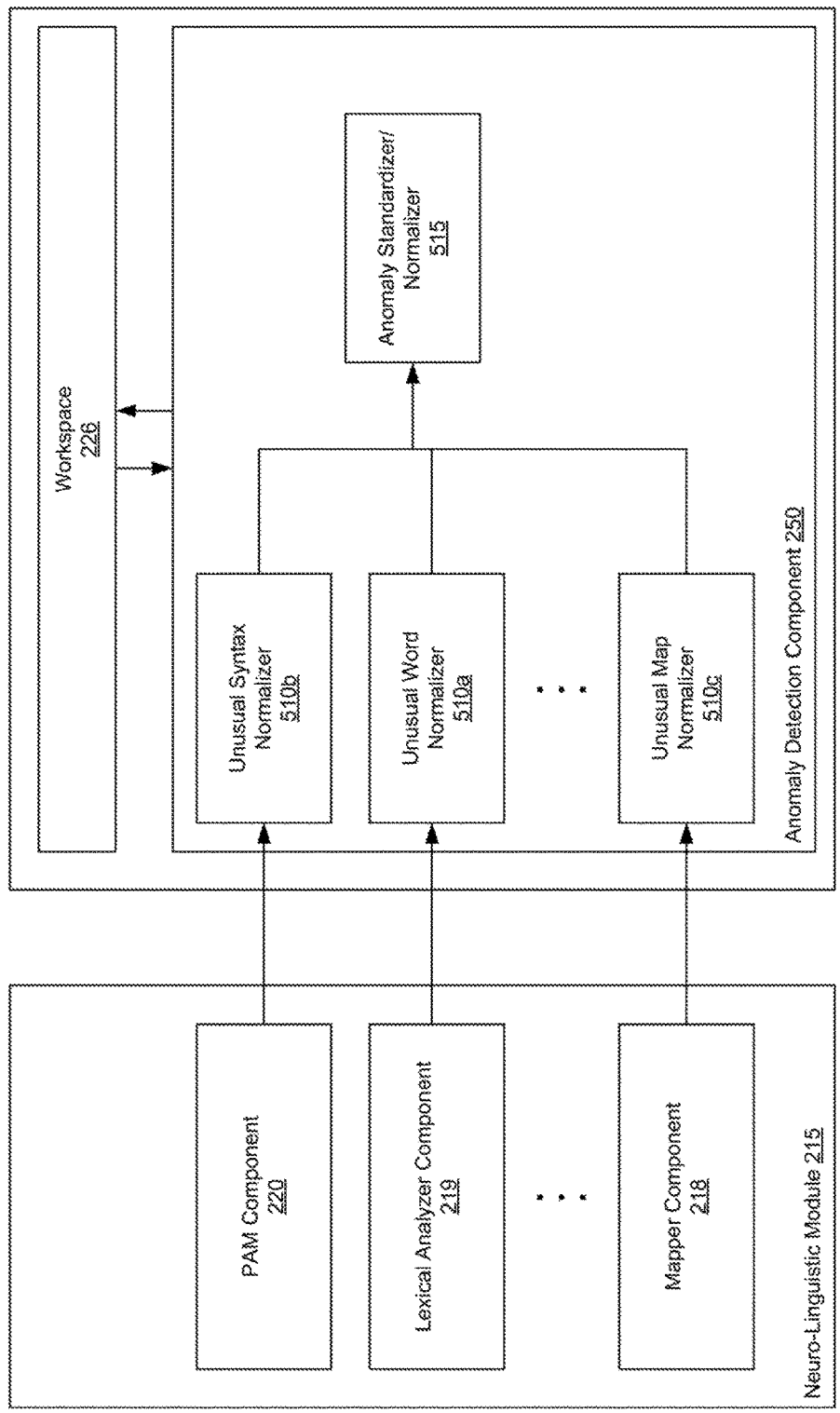
FIG. 5 illustrates an anomaly detection component, according to some embodiments.

FIG. 5 illustrates an anomaly detection component, as described in FIG. 2, according to some embodiments. As shown, the anomaly detection component 250 includes a two stage normalization process via, for example, an unusual word normalizer 510a and an unusual syntax normalizer 510b first stage and an anomaly standardizer (or normalizer) 515 second stage. In certain embodiments, the anomaly detection component 250 may include additional normalizers based on any additional modules in the neuro-linguistic module 215, such as an unusual map normalizer 510c or trajectory normalizer (collectively normalizers).

The unusual word normalizer 510a and the unusual syntax normalizer 510b may receive raw unusualness scores from lexical analyzer component 219 and the PAM component 220, respectively, and output a normalized percentile as against previous unusual scores. As indicated above, the raw unusualness scores indicate how unusual a characteristic observed in the input data is, based generally on how close the observation is to particular stable neuro-linguistic model. For a particular sample, the lexical analyzer component 219 may output a word along with a raw unusualness score for the word, based on how far the sample is from the word in the word model. This output may be received by the unusual word normalizer 510a for comparison and normalization against an unusual word model, which indicates how unusual the raw unusualness score is as compared to previous raw unusualness scores historically. For example, a noisy sensor may result in relatively large raw unusualness scores to be output from the lexical analyzer, but historically as this relatively large raw unusualness score happens relatively often, the normalized anomaly score may be low. Likewise, the output of the PAM or other components may be received by their respective normalizers, for comparison and normalization against an unusual syntax model or another unusual model.

The anomaly standardizer 515 may be functionally similar to the normalizers and may receive input from the output of the normalizers. The unusual word normalizer 510a, the unusual syntax normalizer 510b, and other normalizers output a normalized anomaly score indicating, as a percentile, overall unusualness of the data output from their respective neuro-linguistic module component as compared to historical scores. The anomaly standardizer then receives, as input, these normalized anomaly scores from the normalizers. This two stage normalizing process allows the anomaly standardizer 515 to standardize scores across all of the other normalizers to generate a single anomaly score. This single anomaly score identifies the overall unusualness of observed data generated based on observations of a scene and may be used to raise an alert.

Figure 6:
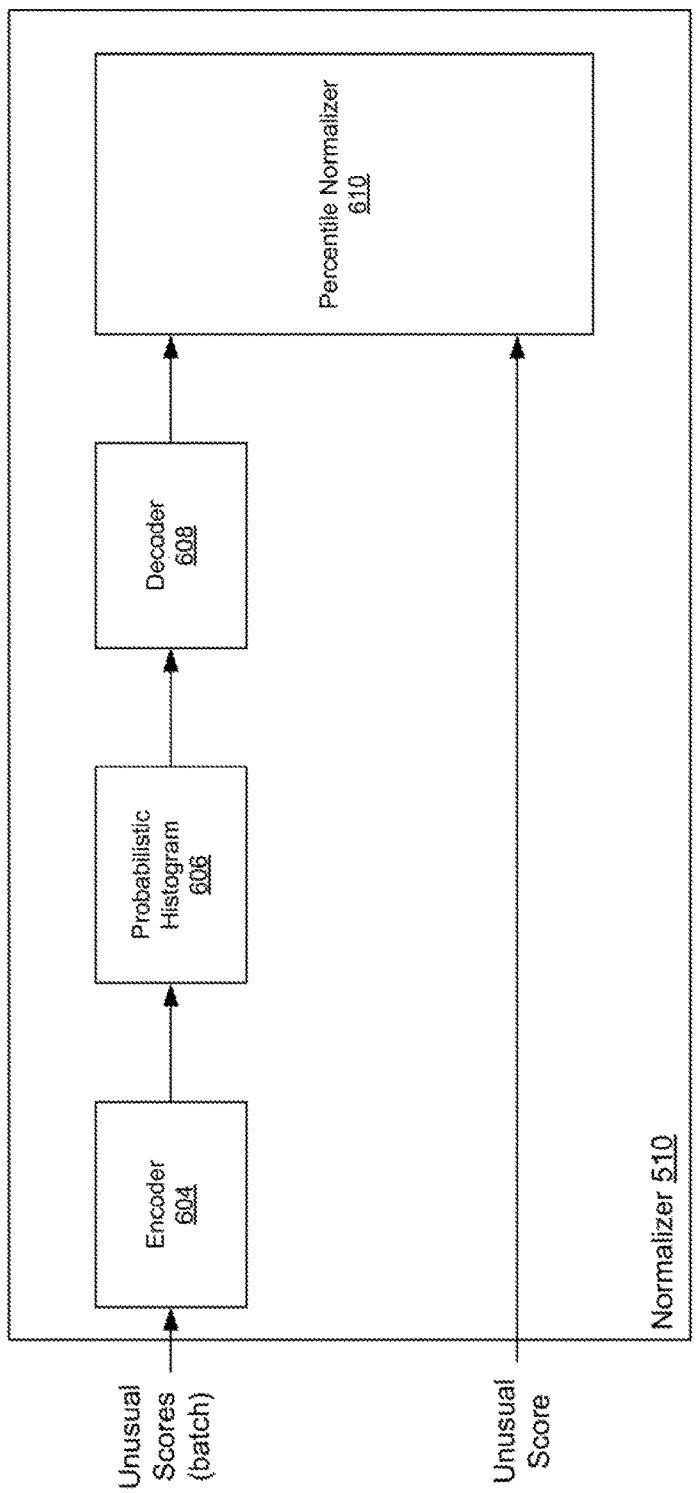
FIG. 6 illustrates an example normalizer, according to some embodiments.

FIG. 6 illustrates an example normalizer 510, according to some embodiments. Generally, the various normalizers (e.g., 510a, 510b), as well as the anomaly standardizer 515 operate similarly, but vary with respect to inputs and what resulting the output represents, as discussed above. In this example, the normalizers may take a numerical approach to the received raw unusualness scores in order to rank the unusualness scores in percentiles without assuming any particular distribution of the scores. For example, a normalizer, may build a historical pool of unusualness scores into the unusual model. The normalizer 510 may then determine the percentile in which a particular unusualness score falls within based on a comparison based on this unusual model.

The historical pool may be based on unusualness scores received by the normalizer 510. As raw unusualness scores are received, the scores are stored in the workspace 226. After a threshold number of unusualness scores or a certain amount of time has passed, an unusual model may be created or updated based on a batch of the stored unusualness scores. In creating or updating the unusual model, the encoder 604 may encode the unusualness scores.

Figure 7A:
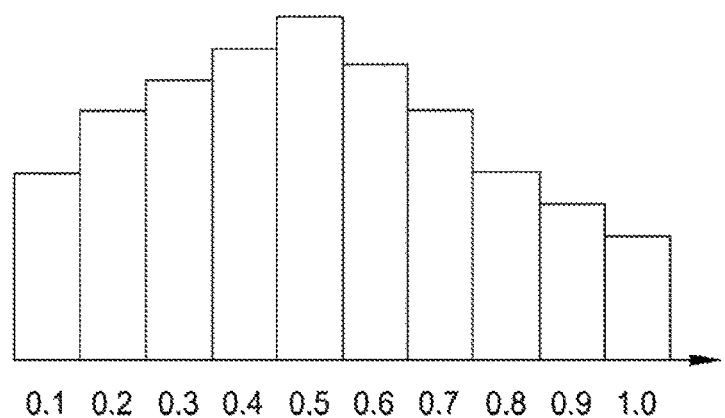
FIG. 7A illustrates an example histogram, according to some embodiments.

For some embodiments, the unusualness scores may be encoded as a histogram. FIG. 7A illustrates an example histogram, according to some embodiments. Encoding as a histogram requires minimum computation as the value of the scores to be encoded just need to be compared to the value of the bins. However, where the unusualness scores may be any value between 0 and 1 with no assumptions about the distributions of the unusualness scores, the number of bins that may be needed may be very large and resulting high memory consumption. Additionally different data may require a different number of bins and bin sizes, requiring too much tuning to be generalized.

Figure 7B:
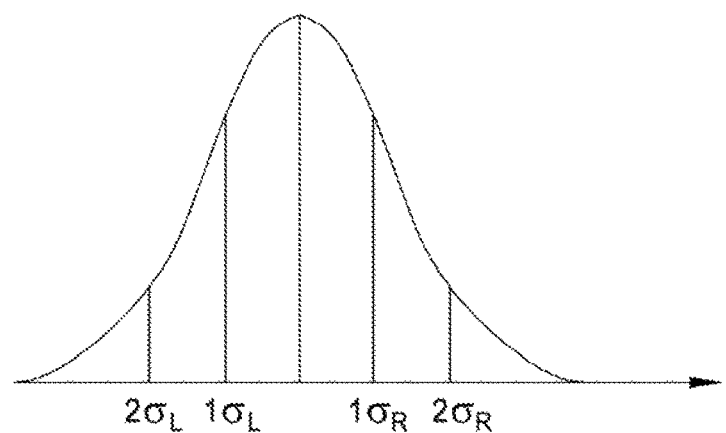
FIG. 7B illustrates an example probability distribution, according to some embodiments.

In some embodiments, the unusualness scores may be encoded as a probability distribution. FIG. 7B illustrates an example probability distribution, according to some embodiments. Encoding as a probability distribution is relatively easy to calculate based on the mean and variance. Resolution may be enhanced with information related to the standard deviations, such as the first and second standard deviations left and right of the mean. However, probability distributions may be quite lossy and not preserve much information, as well as require assumptions about the distribution of the scores (e.g., normal, Gaussian, etc. distribution), and it is relatively computationally intensive to compute percentile rankings based on the probability distribution.

Figure 7C:
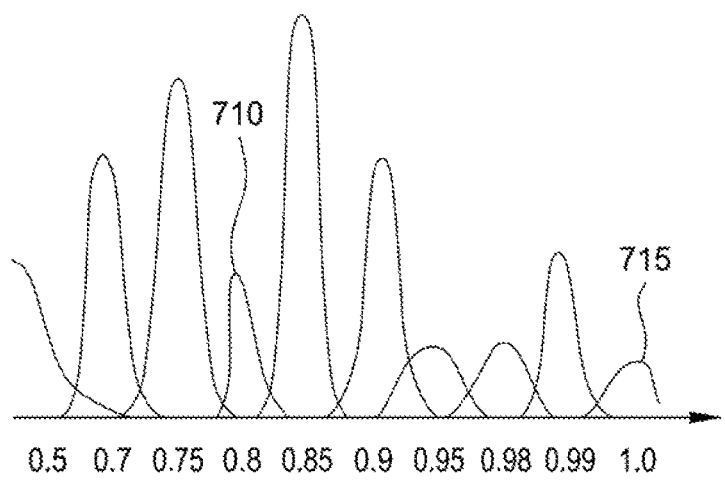
FIG. 7C illustrates an example probabilistic histogram, according to some embodiments.

In other embodiments, the unusualness scores may be encoded as a probabilistic histogram 606 stored, for example, in the workspace. FIG. 7C illustrates an example probabilistic histogram, according to some embodiments. A probabilistic histogram builds a probability distribution across each of a set of bins. This probabilistic histogram may be a lossy encoding of the original unusualness scores, but enables a relatively high level of compression of the original unusualness scores while preserving relatively more detail than the probability distribution. While the probabilistic histogram 606 may be more computationally expensive to build relative to the histogram and probability distributions, the probabilistic histogram 606 allows for relatively cheap encoding and decoding with minimal errors, a relatively easy computation of percentiles after the unusual model is built, and does not necessarily assume any particular distribution.

A probabilistic histogram 606 may be built, in some embodiments, for values between 0 and 1, by arbitrarily dividing up 0 to 1 into ten bins which may or may not have the same size. For example, as illustrated in FIG. 7C, bins corresponding to lower scores may be larger than those corresponding to higher scores to increase resolution at the high end. Each bin may be described by bin variables. These bin variables may comprise seven variables, including a mean of the values within a bin (binMean), a number of values to the left of the mean (binNl), a standard deviation of the values to the left of the mean (binStdL), a number of values to the right of the mean (binNr), standard deviation of the values to the right of the mean (binStdR), a minimum value of the bin (binMin), and a maximum value of the bin (binMax). The bin variables may be included to define each bin and provide an indication of the distribution of the values in the bin. For example, the standard deviation of the values to the right and left increases the resolution and reflect skew on a per bin basis. For example, as seen in 710 and 715, certain bins may be skewed left or right, respectively, based on the standard deviation values to the left and right. Based on the bin variables, a pool of unusualness scores for each bin may be reconstructed.

The decoder 608 decodes the probabilistic histogram 606, as described by the bin variables, reconstructing a pool of scores based on the encoded unusualness scores. In some embodiments, based on the mean, the number of values to the left and right of the mean and the standard deviations to the left and right of the mean, a distribution may be determined. For example, the standard deviation and number of values to sides of the mean may indicate a distribution sigma [x0, x1, x2, x3] may be a normal distribution (i.e., [0.68, 0.27, 0.04, and 0.01]), where each band has the width of one standard deviation. Based on the number of values to the left and right of the mean, the number of encoded scores, sigma_n, may be determined. A step value may be determined based on the standard deviation divided by a size of a standard deviation step (i.e., step=std/size(x_i). An encoded score k may then be calculated as sample (k)=mean+/−ith(x_i)*std+/−(k*step). The minimum and maximum value for each bin may then be appended to the reconstructed scores such that [min, samples, max] represents the reconstructed scores for each bin.

After receive an unusualness score, a normalizer 510 may decode its respective unusual model and compare the received unusualness score, x, to the decoded samples in unusual model, xs. The overall sample size of xs after decoding may be represented as sz_xs. The decoded unusual model xs may be filtered such that samples of xs smaller than x (i.e., xs<x) may be represented by xs_less, the size of which may be represented as sz_xs_less. The decoded unusual model xs may also be filtered for values close to the received unusualness score x such that (x-delta)<xs<=(x+ delta), as unusualness scores may be continuous across a range. Values close to the received unusualness score x may be represented as xs_between and the size of which may be represented as sz_xs_between. The percentile normalization for the received unusualness score against the unusual model may then be determined as (100*(sz_xs_less+0.5*sz_xs_between))/sz_xs. For example, a model may contain 1000 samples such that sz_xs=1000, where 900 unusual samples have a value less than that of x. Additionally, sz may include 50 scores close to x such that sz_xs_between =50. Normalization of this example thus indicates that the received unusualness score is (100*(900+0.5*50))/1000, or in the 92.5 percentile.

In some embodiments, percentile scores for a received unusualness score may be generated against unusual models for various time periods. For example, separate unusual models may be generated for a pool of scores from the last hour, the last day, the last week, and/or all of the scores ever received except those from the last week. A normalized score may then be generated based on the percentile scores for output. This normalized score may be weighted such that scores from a certain time period carry more weight than others. For example, the normalized score may be a function of variables a, b, c, and d where a+b+c+d=1 and the normalized score equal to a*percentile for the last hour+ b*percentile for the last day+c*percentile for the last week+ d*percentile for all scores.

Received unusualness scores may also be added into the unusual model. For example, after the received unusualness score is compared to the decoded unusual model, the received unusualness score may be added to the decoded scores of the unusual model, and encoded. Adding additional received unusualness scores may be performed each time an unusualness score is received, after a certain number of unusualness scores are received, or after a defined period of time.

Figure 8:
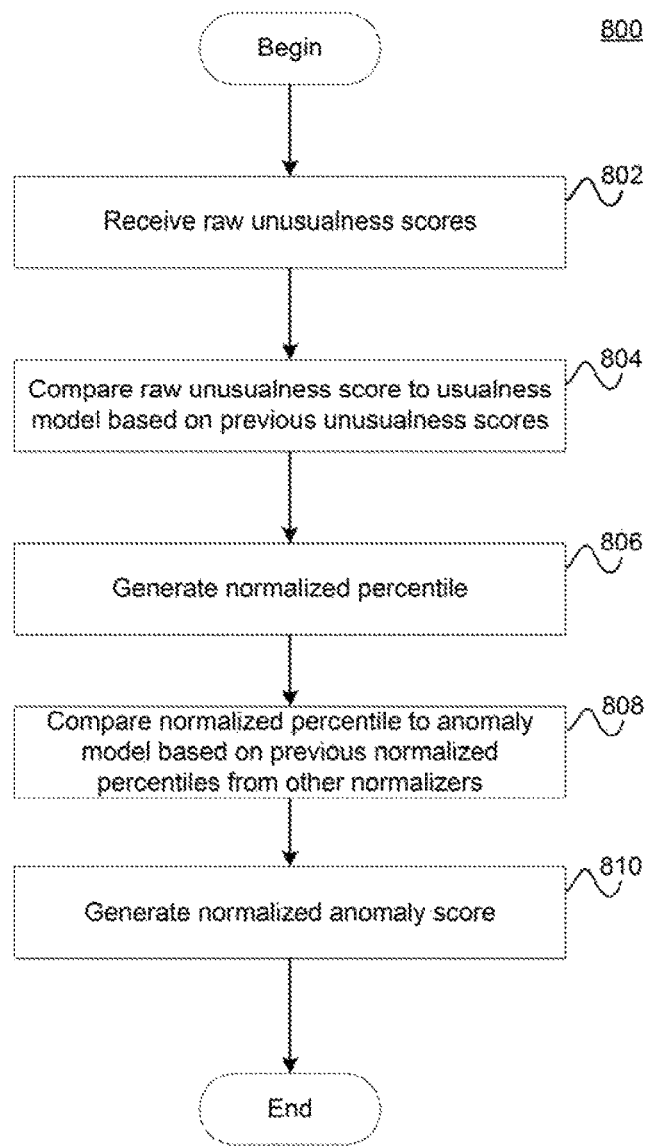
FIG. 8 illustrates a method for generating a normalized anomaly score for sensor data for use in a neuro-linguistic behavior recognition system, according to some embodiments.

FIG. 8 illustrates a method 800 for generating a normalized anomaly score for sensor data for use in a neuro-linguistic behavior recognition system, according to some embodiments. As discussed above, a two stage normalization process may be used in order to standardize unusualness scores received from multiple components into a normalized, overall anomaly score for a scene. Method 800 begins at step 802, where a normalizer receives a raw unusualness score from a component of the neuro-linguistic module, such as the PAM or Lexical Analyzer component generated based on observations of a scene. At 804, the normalizer may compare the raw unusualness score to an unusualness model constructed from previous unusualness scores observed by the normalizer. Based on this comparison, the normalizer, at 806, may generate a normalized percentile indicating how unusual the raw unusualness score is as compared to previous unusualness scores. This normalized percentile may be passed to an anomaly normalizer where the normalized percentile may be compared, at 808, to an anomaly model constructed from previous normalized percentiles received from one or more normalizers. Based on this second comparison, a normalized anomaly score may be generated at 810 indicating, as a percentile, overall unusualness of a set of data values.

Some embodiments of the present disclosure are implemented as a program product for use with a computer system. The program(s) of the program product defines functions of the embodiments (including the methods described herein) and can be contained on a variety of computer-readable storage media. Examples of computer-readable storage media include (i) non-writable storage media (e.g., read-only memory devices within a computer such as CD-ROM or DVD-ROM disks readable by an optical media drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present disclosure, are embodiments of the present disclosure. Other examples media include communications media through which information is conveyed to a computer, such as through a computer or telephone network, including wireless communications networks.

In general, the routines executed to implement the embodiments of the present disclosure may be part of an operating system or a specific application, component, program, module, object, or sequence of instructions. The computer program of the present disclosure is comprised typically of a multitude of instructions that will be translated by the native computer into a machine-readable format and hence executable instructions. Also, programs are comprised of variables and data structures that either reside locally to the program or are found in memory or on storage devices. In addition, various programs described herein may be identified based upon the application for which they are implemented in a specific embodiment of the disclosure. However, it should be appreciated that any particular program nomenclature that follows is used merely for convenience, and thus the present disclosure should not be limited to use solely in any specific application identified and/or implied by such nomenclature.

As described, embodiments herein provide techniques for determining a syntax based on a dictionary of words that represents data input from a source (e.g., video source, SCADA source, network security source, etc.) via a neuro-linguistic behavior recognition system. The symbols, words, and syntax form the basis for a linguistic model used to describe input data observed by the behavior recognition system. The behavior recognition system analyzes and learns behavior based on the linguistic model to distinguish between normal and abnormal activity in observed data. Advantageously, this approach does not relying on pre-defined patterns to identify behaviors and anomalies but instead learns patterns and behaviors by observing a scene and generating information on what it observes.

While the foregoing is directed to embodiments of the present disclosure, other and further embodiments of the disclosure may be devised without departing from the basic scope thereof, and the scope thereof is determined by the claims that follow.

What is claimed is:

1. A computer-implemented method for anomaly detection, the method comprising:
   executing a neuro-linguistic model to generate a raw unusualness score based on input data obtained from at least one of a video data source, a supervisory control and data acquisition (SCADA) system, or a data network security system, the raw unusualness score indicating how often a characteristic is observed in the input data;
   comparing the raw unusualness score with an unusualness score model to generate an unusualness score, the unusualness score model produced from historical raw unusualness scores;
   comparing the unusualness score with an anomaly score model to generate an anomaly score that represents, as a percentile, an unusualness of the input data, the anomaly score model produced from historical unusualness scores; and
   sending alert data based on the anomaly score.

2. The method of claim 1, wherein the unusualness score model uses a probabilistic histogram based on previously received scores.

3. The method of claim 1, wherein the anomaly score model uses a probabilistic histogram based on unusualness scores from the unusualness score model.

4. The method of claim 3, wherein comparing the unusualness score includes:
   decoding the anomaly score model to reconstruct a set of previously determined unusualness scores; and
   comparing the unusualness score to the set of previously determined unusualness scores.

5. The method of claim 1, further comprising encoding the unusualness score in the unusualness score model.

6. The method of claim 1, further comprising encoding the unusualness score in the anomaly score model.

7. A non-transitory processor-readable medium storing code representing instructions to be executed by a processor, the code comprising code to cause the processor to:
   execute a neuro-linguistic model to generate a raw unusualness score based on input data obtained from at least one of a video data source, a supervisory control and data acquisition (SCADA) system, or a data network security system, the raw unusualness score indicating how often a characteristic is observed in the input data;
   compare the raw unusualness score with an unusualness score model to generate an unusualness score, the unusualness score model produced from historical raw unusualness scores;
   compare the unusualness score with an anomaly score model to generate an anomaly score that represents, as a percentile, an unusualness of the input data, the anomaly score model produced from historical unusualness scores; and
   send alert data based on the anomaly score.

8. The non-transitory processor-readable medium of claim 7, wherein the unusualness score model uses a probabilistic histogram based on previously received scores.

9. The non-transitory processor-readable medium of claim 7, wherein the anomaly score model uses a probabilistic histogram based on unusualness scores from the unusualness score model.

10. The non-transitory processor-readable medium of claim 9, wherein the code to cause the processor to compare the unusualness score includes code to cause the processor to:
    decode the anomaly score model to reconstruct a set of previously determined unusualness scores; and
    compare the unusualness score to the set of previously determined unusualness scores.

11. The non-transitory processor-readable medium of claim 7, wherein the code further comprises code to cause the processor to encode the usualness score in the unusualness score model.

12. The non-transitory processor-readable medium of claim 7, wherein the code further comprises code to cause the processor to encode the unusualness score in the anomaly score model.

13. The non-transitory processor-readable medium of claim 7, wherein the unusualness score represents a percentile ranking indicating the unusualness of the raw unusualness score as compared to previously received scores.

14. A system, comprising:
    a memory; and
    a processor operatively coupled to the memory, the processor configured to:
       execute a neuro-linguistic model to generate a raw unusualness score based on input data obtained from at least one of a video data source, a supervisory control and data acquisition (SCADA) system, or a data network security system, the raw unusualness score indicating how often a characteristic is observed in the input data;
       compare the raw unusualness score with an unusualness score model to generate an unusualness score, the unusualness score model produced from historical raw unusualness scores;
       compare the unusualness score with an anomaly score model to generate an anomaly score that represents, as a percentile, an unusualness of the input data, the anomaly score model produced from historical unusualness scores; and
       send alert data based on the anomaly score.

15. The system of claim 14, wherein the unusualness score model comprises a probabilistic histogram based on previously received scores.

16. The system of claim 14, wherein the anomaly score model comprises a probabilistic histogram based on unusualness scores from the unusualness score model.

17. The system of claim 16, wherein the processor is configured to compare the unusualness score by:
  decoding the anomaly score model to reconstruct a set of previously determined unusualness scores; and
  comparing the unusualness score to the set of previously determined unusualness scores.

18. The system of claim 14, wherein the processor is configured to encode the unusualness score in the unusualness score model.

19. The system of claim 14, wherein the processor is configured to encode the usualness score in the anomaly score model.

* * * * *